Nov. 2, 1965 R. F. WEST 3,214,836
COILABLE RULE
Filed April 1, 1963 2 Sheets-Sheet 2

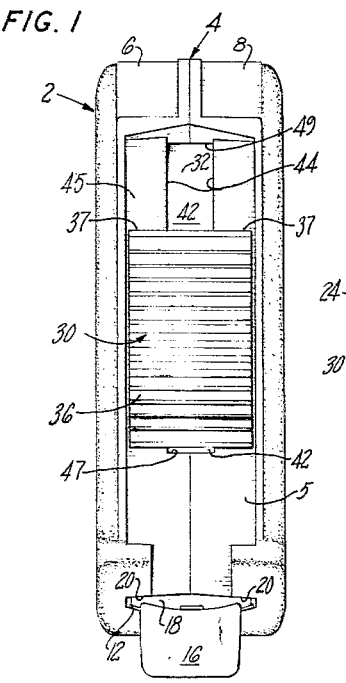

INVENTOR.
ROBERT F. WEST

BY Lindsey, Prutzman and Hayes
ATTORNEYS

United States Patent Office 3,214,836
Patented Nov. 2, 1965

3,214,836
COILABLE RULE
Robert F. West, Simsbury, Conn., assignor to The Stanley Works, New Britain, Conn., a corporation of Connecticut
Filed Apr. 1, 1963, Ser. No. 269,372
5 Claims. (Cl. 33—138)

This invention relates to coilable rules which utilize a measuring tape and has for its principal object the provision of an improved coilable rule incorporating a novel lock mechanism for releasably holding the measuring tape against movement in various extended positions.

A further object of the present invention is to provide such a coilable rule wherein the lock mechanism will effectively hold the measuring tape in extended position but will permit movement of the measuring tape when the tape is subjected to axial loads tending to buckle it so as to minimize the possibility of damage thereto.

A still further object of the present invention is to provide in such a coilable rule a novel lock mechanism having an economical and durable construction including only one movable part that may be supported by the casing without requiring additional parts and which does not require close dimensional tolerances in its manufacture.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a front elevational view of a coilable rule constructed in accordance with the present invention;

FIG. 2 is a side elevational view of the coilable rule with portions broken away to show the locking mechanism in operative or locking position;

FIG. 3 is a view similar to FIG. 2 but with the coilable rule omitted and with the lock mechanism shown in release or unlocking position;

FIG. 4 is an enlarged fragmental cross-sectional view taken generally along lines 4—4 of FIG. 2;

Figure 5:
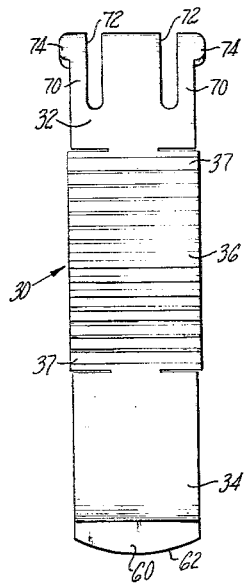
FIG. 5 is a front elevational view of a brake member included in the lock mechanism.

Referring to the drawings in detail, FIG. 1 shows a measuring device generally designated 2 embodying the present invention comprising a two-piece casing 4 including a pair of generally boxlike sections 6 and 8 which are suitably held together to form a convex front wall 5 and to define a chamber 10 dimensioned to receive a measuring tape or rule 12 when the latter is in coiled position.

In the illustrated embodiment, the measuring tape 12 is of the concavo-convex type formed from a suitable material such as spring steel and having its innermost end suitably connected to a winding mechanism such as the spring 13 so as to automatically be driven thereby into coiled position in the casing chamber 10 when the measuring tape 12 is released, as will be subsequently described, from any of its extended positions. A more detailed description of the winding mechanism and the casing construction as well as a novel guide and bearing means for the measuring tape and winding mechanism may be found in a copending United States application Serial No. 270,226 filed April 3, 1963, by Austin Stowell, entitled Coilable Rule, and assigned to the assignee of the present invention.

As shown, the front wall 5 of the casing 4 provides a pair of registering slots 20 formed in the casing sections 6, 8 to define a mouth 18 through which the measuring tape 12 passes. The outer end 14 of the measuring tape 12 is provided with a hook 16 for facilitating manipulation of the measuring tape 12 and for limiting movement thereof into the casing by engagement with the front wall 5 thereof.

In accordance with the present invention, there is provided a novel lock mechanism for releasably wedging the measuring tape 12 against the bottom wall 3 of the casing to thereby lock the measuring tape against movement in any of its extended positions. In the illustrated embodiment, the lock mechanism 24 comprises an arcuate slide of brake member generally designated 30 molded from a suitable flexible, resilient, hardwearing and self-lubricating material such as nylon. The arcuate brake member 30 includes thin tonguelike upper and lower portions 32, 34 having generally the same radius of curvature, and an intermediate portion 36 positioned between the upper and lower portions and offset therefrom by means of a web 38 which thereby forms a pair of longitudinally extending recesses or grooves 40 on opposite sides of the web 38.

The brake member 30 is mounted for slidable movement to the front wall 5 of the casing 4 with the lower portion 34 of the brake member overlying and extending generally oblique to the measuring tape 12 so as to act as a wedge, and with the intermediate portion 36 of the brake member positioned on the external side of the front wall so as to provide a button, shown as being serrated, for operating the brake member 30 as will be subsequently described. This mounting of the brake member 30 is effected in the illustrated embodiment through means of an elongated opening 42 provided in the front wall 5 of the casing by a pair of registering slots or cutout portions 44 formed in the front wall 5 of the casing sections 6 and 8 as best shown in FIG. 1. The elongated opening 42 receives therethrough, the web 38 of the brake member 30 with the sides 37 of the operating button 36 overlying the front wall portions 45 on opposite sides of the opening 42 which form bearing surfaces, and with the upper and lower portions 32, 34 of the brake member underlying the front wall portions 45.

Since in the illustrated embodiment, as shown in FIGS. 2 and 3, the front wall 5 of the casing 4 is formed with a convex shape, the upper and lower portions 32, 34 of the brake member 30 are configured to confirm to the internal surface of the front wall 5 whereby sliding movement of the brake member 30 relative to the front wall 5 of the casing will be characterized by the brake member undergoing revolving movement.

Figure 7:
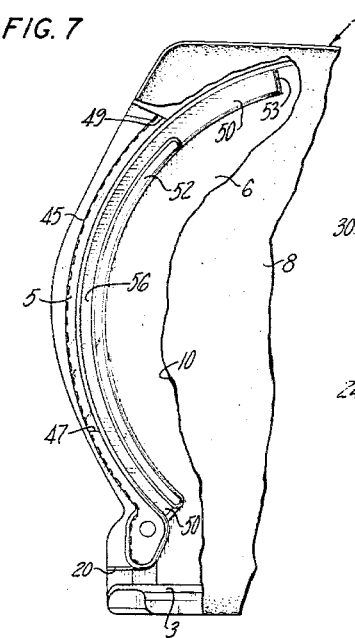
FIG. 7 is a fragmental side elevational view of the casing sections showing the internal construction thereof which receives the brake member.
Figure 8:
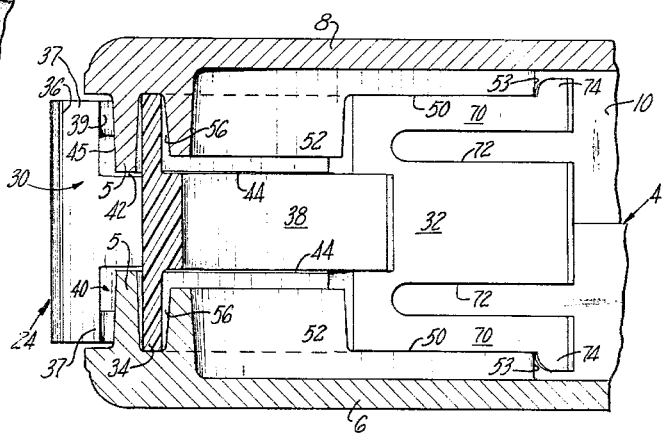
FIG. 8 is an enlarged fragmental cross-sectional view taken generally along lines 8—8 of FIG. 3.

In the illustrated embodiment, in order to insure that the brake member 30 will be properly guided and supported during its sliding movement, there is provided a pair of arcuate bosses 50 projecting inwardly from the internal sidewall surfaces of sections 6, 8 of the casing respectively, which bosses are positioned so as to engage the opposite edges respectively of the upper and lower portions 32, 34 of the brake member 30 as best shown in FIGS. 7 and 8. To this end there is additionally provided a pair of arcuate flanges 52 projecting from the arcuate bosses 50 in spaced relationship to the front wall 5 so as to form with the front wall a pair of grooves or channels 56 which receive the upper and lower portions 32, 34 of the brake member 30 whereby, as a result, the latter are positively supported and guided on all sides.

The lower or wedging portion 34 of the brake member 30 is provided with a tab or shoe 60 which, in the shown embodiment, is integrally formed on the extremity of the wedging portion 34 and projects generally perpendicularly to a line drawn tangent thereto. The wedging portion 34 including the shoe 60 is dimensioned so that when the brake member 30 is rotated counterclockwise (as viewed in the drawings) by means of the button 36 to its lowermost position shown in FIG. 2, the shoe 60 will engage the top surface of the measuring tape 12 so as to force the measuring tape 12 against the bottom wall 3 of the casing in a wedge-like manner to thereby lock the measuring tape 12 against movement in its extended position.

This engagement between the shoe 60 and the tape 12 is characterized by slight upward deflection (as viewed in the drawings) of the free end of the wedging portion 34 of the brake member 30, which not only provides for an effective lock on the tape 12, but also permits the same to be obtained without requiring a biasing spring or close dimensional tolerances in the manufacture of the brake member. Additionally, this wedging engagement between the shoe 60 and the tape 12 is aided by the tendency of the tape 12 to move into coiled position under the influence of its driving spring 13, since the effect of the force of the driving spring 13 on the brake member 30 is to maintain the same in locking position.

As best shown in FIG. 4, the free edge 62 of the shoe 60 is arcuately formed to conform to the curvature of the concave side of the measuring tape 12 so as to insure against permanent deformation of the tape 12 as well as to reduce the forces opposing the locking thereof.

Movement of the brake member 30 into locking or operative position shown in FIG. 2, is limited by the engagement between one end of the web 38 of the brake member 30 and the front wall portion 47 which defines one end of the opening 42 therein, while movement of the brake member 30 to its unlocking or release position shown in FIG. 3 is limited by the engagement between the opposite end of web 38 and the front wall portion 49 which defines the opposite end of the opening 42.

Figure 6:
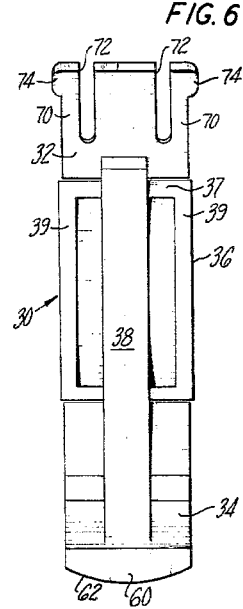
FIG. 6 is a rear elevational view of the brake member.

In order to releasably retain the brake member 30 in its release or unlocking position shown in FIG. 3 wherein the measuring tape 12 is free to move, a retaining means is provided which, in the shown embodiment, comprises a pair of generally elongated resilient fingers 70 formed on the upper portion 32 of the brake member 30 by a pair of longitudinally extending slots 72 as best shown in FIGS. 5 and 6.

Each of the fingers 70 is provided with a laterally extending bumplike projection 74 on the free ends thereof dimensioned to engage one of the upper end surfaces 53 of the arcuate bosses 50 which provide stops (as best shown in FIGS. 3 and 8) when the brake member 30 is moved fully clockwise (as viewed in FIG. 3) to thereby retain the brake member 30 in released position. The retaining influence of the finger projections 74 is overcome when the operator moves the brake member 30 into locking position which causes the fingers to be deflected inwardly towards each other by the stop surfaces 53, thereby permitting the brake member 30 to move smoothly into locking position.

If desired, the external bearing surfaces of the front wall portions 45 which engage the underside 39 of the operating button 36 of the brake member 30, may be knurled so as to provide an additional means for releasably retaining the brake member 30 in unlocking position.

During use of the measuring device, should it be desired to lock the tape 12 against movement in any of its extended positions, the operator is merely required to push the button 36 downwardly (as viewed in the drawings) into locking position and this may be quickly and conveniently accomplished by the thumb due to the placement of the button 36 on the front wall of the casing. As described above, this will cause the brake member 30 to wedge the tape 12 against the bottom wall 3 of the casing whereby the tape 12 will be sufficiently held against movement for the desired purpose.

Since the holding power of the brake member 30 is determined by the inherent resiliency of the lower portion 34 thereof and its frictional engagement with the tape 12, it will be appreciated that should the tape 12 be subjected, for example, to an axial load of the magnitude tending to buckle and possibly permanently deform or tear the same, the brake member 30 will give or deflect because of its flexibility to thereby permit the tape 12 to slightly withdraw into the casing so as to minimize the possibility of such damage.

This flexible and resilient character of the brake member 30 also permits the tape 12 to be manually extended when the brake member is in locking position to thereby highly facilitate "inside" measuring operations where it is advantageous to lock the tape in a position just short of the distance to be measured and then to manually extend the tape to fully span the distance to be measured.

Of course, when it is desired to release the tape 12 from the effect of the locking mechanism, the operator is merely required to flick the button 36 upwardly to release position whereby the brake member 30 will be moved out of engagement with the tape 12.

When the brake member 30 is in this release position, the resilient finger 70 will engage the stop surfaces 53 as described above to thereby retain the brake member 30 against accidental movement into engagement with the tape 12.

From the foregoing it will be seen that the present invention provides an improved coilable rule wherein the measuring tape may be positively locked in any extended position wherein it will not creep or slip back into the casing to thereby insure an accurate measurement.

As will be apparent to persons skilled in the art, various modifications and adaptations of the structure above described will become readily apparent without departure from the spirit and scope of the invention, the scope of which is defined in the appended claims.

I claim:

1. A measuring device comprising a casing including a bottom wall and a convex front wall having a first opening adjacent the bottom wall and a second longitudinally extending opening spaced above the first opening, a measuring tape coilable in the casing and being movable through said first opening, a brake member having a generally arcuate body formed of resilient and flexible material including first and second tonguelike portions positioned in the casing and being slidably engageable with the inner surface of said front wall, a third operating portion positioned externally of the casing and being slidably engageable with the external surface of the front wall, and a web portion extending through said second opening interconnecting said operating portion with said first and second portions, said brake member being slidable on the front wall of the casing toward and away from said bottom wall of the casing between engaged and released positions limited by the engagement between said web portion and the portions of the front wall defining the opposite ends of said second opening, one of said first and second portions of said brake member extending at an acute angle to the coiling direction of the tape and, upon being moved into said engaged position, engaging an extended portion of the tape and resiliently wedging the same against the bottom wall of the causing thereby frictionally retaining the tape against unintended movement.

2. The measuring device as defined in claim 1 wherein said casing is provided therein with a pair of arcuate coplanar flanges spaced from the front wall to form with the front wall channels receiving said first and second portions of the brake member to guide the same during movement of the brake member.

3. The measuring device as defined in claim 1 wherein the other of said first and second portions of the brake member is provided with at least one longitudinal slot forming a resilient finger adjacent one of the side edges thereof, said finger having a laterally extending projection, and wherein said casing has a stop surface positioned therein to engage said projection on the finger when the brake member is in unlocking position to thereby releasably retain the brake member in unlocking position.

4. In a measuring device including a casing having an opening therein forming a mouth, and a measuring tape coilable in the casing and being movable through said opening, a mechanism for releasably holding the measuring tape against unintended movement comprising a resilient brake member having a generally arcuate body, means mounting the brake member on the casing for slidable movement toward and away from the tape between engaged and released positions with respect thereto, the brake member extending at an acute angle to the coiling direction of the tape and, upon being moved into the engaged position, engaging the tape and resiliently wedging the same against a portion of the casing thereby frictionally retaining the tape against unintended movement.

5. In a measuring device comprising a casing having a bottom wall and a front wall having an opening therein adjacent the bottom wall, and a measuring tape coilable in the casing and movable through said opening, a mechanism for releasably holding the measuring tape against unintended movement comprising a brake member mounted on the front wall of the casing for slidable movement toward and away from the bottom wall thereof between engaged and released positions, the brake member having a cantilever mounted free end formed of flexible and resilient material providing a wedging portion disposed generally oblique to an extended portion of the measuring tape and extending in the direction of its winding movement, said wedging portion of the brake member engageably contacting the tape and resiliently wedging the same against the bottom wall of the casing, when the brake member is moved to the engaged position, thereby frictionally retaining the tape against unintended movement.

References Cited by the Examiner
UNITED STATES PATENTS

| 1,800,911 | 4/31 | Smith | 242—84.8 |
| 2,016,483 | 10/35 | Carlson | 33—138 |
| 2,536,766 | 1/51 | Pechstein | 242—84.8 |

FOREIGN PATENTS

| 527,414 | 6/31 | Germany. | |

ISAAC LISANN, *Primary Examiner.*